United States Patent [19]

Hutzler

[11] 4,043,919
[45] Aug. 23, 1977

[54] PRESSURE SCREEN WITH TURBULENCE CHAMBER MEANS

[75] Inventor: Hagen Hutzler, Reutlingen, Germany

[73] Assignee: Hermann Finckh Maschinenfabrik, Pfullingen, Germany

[21] Appl. No.: 693,916

[22] Filed: June 8, 1976

[30] Foreign Application Priority Data

June 14, 1975 Germany .............................. 2526657

[51] Int. Cl.² ...................... B01D 21/02; B01D 21/18; B01D 25/32; B01D 33/36
[52] U.S. Cl. ................................ 210/407; 162/343; 209/273; 210/414; 210/415; 210/435; 210/512 R
[58] Field of Search .............................. 209/273, 243; 210/512 R, 340, 333, 338, 342, 349, 409, 380, 324, 405, 407, 413, 414, 415, 435; 162/343

[56] References Cited

U.S. PATENT DOCUMENTS

| | | |
|---|---|---|
| 2,902,156 | 9/1959 | Dahlberg .......................... 210/512 R |
| 3,051,233 | 8/1962 | Baxter .................................. 162/343 |
| 3,387,708 | 6/1968 | Salomon et al. ...................... 209/273 |
| 3,456,793 | 7/1969 | Salomon ................................ 209/273 |
| 3,581,893 | 6/1971 | Rich ...................................... 209/273 |
| 3,647,067 | 3/1972 | Vogel .................................... 209/273 |
| 3,735,873 | 5/1973 | Bergstedt ............................. 209/273 |

Primary Examiner—Frank W. Lutter
Assistant Examiner—Frank Sever
Attorney, Agent, or Firm—Shenier & O'Connor

[57] ABSTRACT

Apparatus for separating a fibrous suspension of raw stock into acceptable stock and waste material in which an inlet at one end of a casing directs raw stock against a conical plate closing one end of a rotor in the housing and into an annular elongated inner chamber formed between the imperforate peripheral wall of the rotor and a stationary cylindrical screen surrounding the rotor in the housing so that acceptable stock passes through the screen into an outer space from which it can be removed through a suitable outlet and waste material is directed by elongated angularly inclined ribs on the outer surface of the rotor wall into a turbulence chamber in which a radially extending rib on the other end of the rotor acts on the stock and from whence relatively light waste material is removed through a tangentially extending outlet at the top of the casing and relatively heavy material is removed through an outlet at the bottom of the casing and in which diluent water is introduced into the turbulence chamber through an inlet pipe in a direction generally tangenital to the stock flow and in the direction of the flow.

11 Claims, 3 Drawing Figures

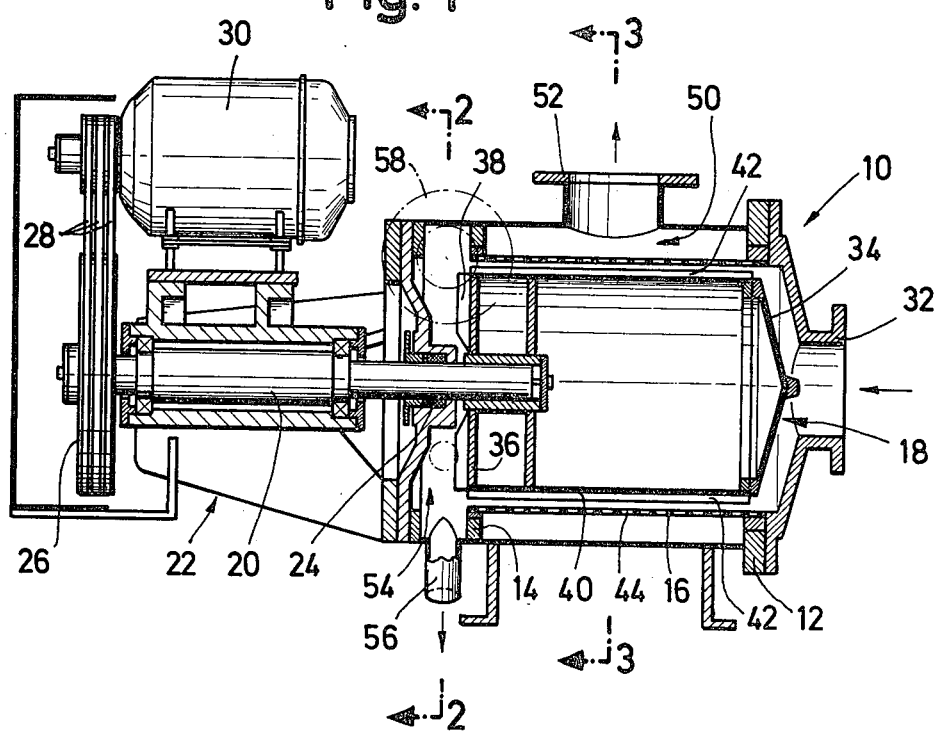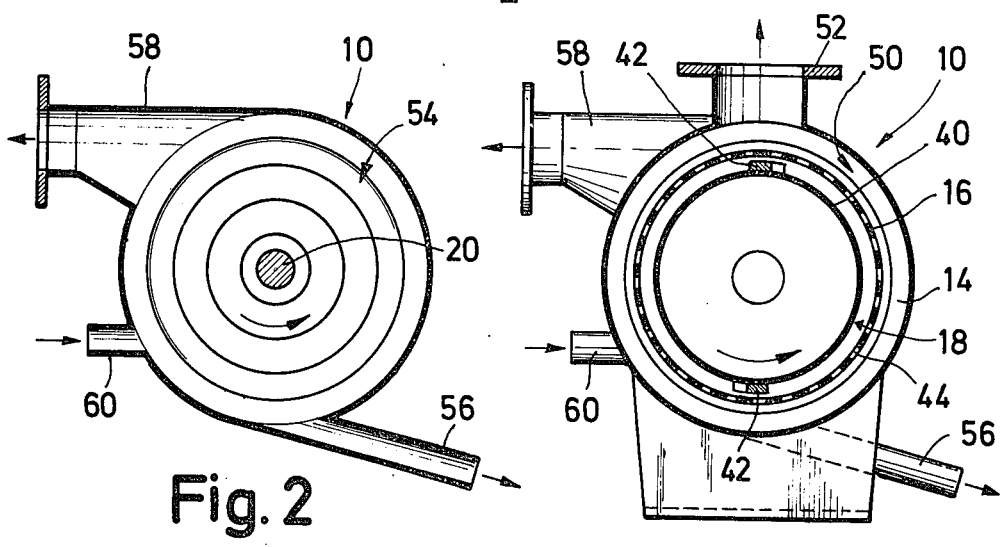

PRESSURE SCREEN WITH TURBULENCE CHAMBER MEANS

BACKGROUND OF THE INVENTION

The invention relates to a pressure screen for fibrous suspensions having a casing which accommodates a fixed cylindrical screen cage and a cylindrical rotor arranged for rotation therein, an inlet for the raw fibre stock in the region of one end of the rotor, an outlet for the separated specifically light waste matter of the suspension and a diluting water inlet in the region of a casing chamber bounding the other end of the rotor, and an outlet for the accepted stock communicating with the space external to the screen cage.

In the Wochenblatt fer Papierfabrikation, No. 15 (1973), page 567 there is disclosed such a pressure screen as a part of an apparatus for treating waste paper. This apparatus includes, underneath the pressure screen provided with a vertically arranged screen cage and a similarly arranged rotor, a so-called vortex cleaner, into which the specifically heavy particles of dirt are deposited and extracted through a so-called sediment trap. The raw fibre stock then flows upwardly at the centre of the vortex cleaner and from below into the downwardly open rotor designed as a rotating screen cage.

From a casing space above the rotor there is extracted the specifically light waste matter, which has been separated by the pressure screen, and diluting water is also introduced into this space of the casing.

This apparatus demands a comparatively high energy input because a considerable volume of the raw fibre stock must be accelerated and set in circulation. Accordingly the invention takes as its basic purpose the provision of a pressure screen, which, whilst demanding a low energy input, is particularly suitable for suspensions having a low content of the heavier waste matter but which is expecially efficient in removing the lighter dirt from the suspension. Starting from the basis of a pressure screen of the first specified type, this problem is solved by the invention in that the rotor is horizontally arranged and is closed at least at its inlet end and at the periphery, and that it has, at its outlet end, a device for promoting the circulation of the process material, and that the casing space bounding the outlet end of the rotor is provided at the top thereof with the outlet for the specifically lighter waste matter and at the bottom with an outlet for the specifically heavier waste matter. Thus, the apparatus according to the invention intentionally avoids using a vortex cleaner for separating the specifically heavier waste matter so that the volume of the suspension set into circulation is kept as low as possible, whereby driving energy is saved. At the same time however, by arranging the rotor horizontally, introducing the raw fibre stock in the direction of the rotor axis, as well as arranging the outlet for the specifically lighter waste material in the upper part, and arranging the outlet for the specifically heavier waste material in the lower part of the casing space bounding the rearward end of the rotor, there is ensured a reliable separation of the heavier particles from the specifically lighter waste material as well as the separation of the latter from the suspension, notwithstanding the fact that the apparatus according to the invention is of comparatively simple construction, consequently can be cheaply manufactured and is characterized by a compact design. By the introduction of diluting water and the high degree of turbulence, there is achieved in the casing space bounding the end of the rotor at the outlet side, an effective stripping of the lighter and heavier waste components from the acceptable fibre stock, which, in consequence of the introduced diluting water, is rinsed back into the annular space between the rotor and the screen cage and then leaves the pressure screen through the outlet for the accepted stock. It is worth mentioning that, as compared with the known apparatus first described, not only is the volume of suspension set into circulation considerably reduced by the avoidance of a vortex cleaner, but also as a consequence of using a closed rotor, it is only necessary that the circulating suspension shall fill the comparatively narrow annular space between the rotor and the screen cage in addition to the casing space bounding the end of the rotor at the outlet side.

In order that, in addition to the effect obtained by the centrally arranged inlet for the stock at the entrance of the casing, the conveyance of the so-called reject material into the casing space adjacent the outlet end of the rotor shall be further assisted, it is advisable to provide at the periphery of the rotor at least one clearing strip operating upon the screen cage, and which is arranged to be slightly inclined with respect to the rotor axis in such a manner that the moving rotor conveys the suspension in the direction of the outlet end of the rotor. However, the provision of such a clearing strip, or several of such clearing strips, improves not only the efficiency of the throughput, but also the screening effectiveness of the pressure screen.

Having regard to the flow conditions in the casing space adjacent the outlet end of the rotor, it is advisable that an outlet pipe for the specifically lighter waste material as well as an inlet pipe for the diluting water shall be joined to the casing in a direction which is substantially tangential and in correspondence with the direction of the circulation of the process material.

DESCRIPTION OF THE PREFERRED EMBODIMENT

Further features of the invention are the subject matter of the appended Patent Claims, or else will be evident, together with advantages and details of the invention from the accompanying drawing and the following description of a preferred practical form of a pressure screen according to the invention, which drawing comprises the following:

FIG. 1 is an axial section through the pressure screen,

FIG. 2 is a section through the pressure screen shown in FIG. 1 taken along the line 2—2 thereof.

FIG. 3 is a section of the pressure screen shown in FIG. 1 taken along the line 3—3 thereof.

As may be seen from the drawings, the pressure screen according to the invention comprises a pressure-tight casing, indicated by the general reference 10, in which a fixed screen cage is horizontally arranged between casing rings 12 and 14. Within this screen cage rotates a rotor, indicated by the general reference 18, which is secured to the driving shaft 20, whose bearing support means are indicated by the general reference 22. For sealing the casing at the entry of the driving shaft 20 there is provided a stuffing box seal 24. From an electromotor 30, mounted upon the supporting assembly 22, the rotor is driven through a pulley wheel 24 secured to the driving shaft 20 and a driving belt 28.

At its right hand end as seen in FIG. 1, the casing is provided with an inlet nozzle 32, which is centrally arranged and is centered upon a conically shaped rotor cover 34, which closes the rotor at that end. At the other end a rotor base 36 serves a similar purpose, upon which are arranged accelerating strips or ribs 38 extending in the radial direction. The rotor shell 40 forming the outer surface of the rotor carries a plurality of clearing strips 42 which are slightly inclined with respect to the rotor axis, the inclination of these clearing strips being so chosen that a conveying effect from the right hand side to the left, as seen in FIG. 1, is imparted by the rotation of the rotor.

The screen cage is preferably designed with comparatively thick walls, and is provided with apertures which are widened in the direction of flow, because in this way a particularly good screening effect is obtained. In the example of the pressure screen according to the invention shown diagrammatically in the drawing these apertures are designed as slots 44 proceeding approximately in the axial direction of the screen cage or slightly inclined in that direction, and which also widen in the flow direction, that is to say from the inside to the outside of the screen. Good results may however also be achieved if the apertures in the screen cage 16 are in the form of bores, which are widened towards the outside at an angle of at least 30°.

The screen cage is surrounded by an annular space 50, to the top of which is connected an outlet 52 for the so-called accepted stock. Through this outlet there is extracted the fibre suspension to be further processed.

An outlet pipe 56 for specifically heavier waste matter leads in an approximately tangential direction from the bottom of a casing chamber 54 bounding the left hand end of the rotor 18 as seen in FIG. 1, whilst at the top of said chamber there is an outlet pipe 58 for specifically lighter waste matter, which is also substantially tangentially directed, and between these two pipes, also substantially tangentially directed, is an inlet nozzle 60 for the diluting water.

The suspension is conveyed under pressure by a pump into the inlet nozzle 32 of the pressure screen according to the invention, and in a preferred practical form of the invention this suspension is accelerated from an entry speed of about 1m per second by means of the conical rotor cover 32 up to a speed of 10 to 20 m per second and preferably about 15 to 20 m per second at the periphery of the rotor 18. By the rotation of the suspension during its conveyance along the rotor the accepted fibres pass through the screen cage 16 and leave the pressure screen through the outlet 52 for the accepted stock. In the casing chamber 54, which is the so-called rejects chamber, by the introduction of diluting water the dirt is separated from the accepted fibres in consequence of high turbulence, and the floating specifically lighter waste matter leaves the casing chamber 54 in the flow direction through the outlet pipe 58, which is opened periodically, or else is left open continuously at a suitably smaller cross section of the aperture. The specifically heavier waste matter deposits underneath at the outlet pipe 56, which, preferably, is periodically opened.

The pressure screen according to the invention is particularly suitable for use as the second stage of a so-called pulper.

I claim:

1. Apparatus for treating a fibrous suspension of raw fibre stock to separate acceptable stock from waste matter including in combination, a casing, a generally cylindrical screen having a longitudinal axis, means mounting said screen in a fixed position within said housing with the longitudinal axis thereof generally horizontally disposed, said screen and said casing forming an outer chamber therebetween, a generally cylindrical rotor having an imperforate peripheral wall and a first closed end, means mounting said rotor within said screen for rotary movement around a generally horizontal axis, the peripheral wall of said rotor and said screen forming therebetween an inner elongated generally annular chamber, a turbulance chamber means defined by said casing and the second end of said rotor, a first inlet on said casing adjacent to said first rotor end for introducing raw fiber stock into said inner chamber, a first outlet on said casing for removing acceptable stock from said outer chamber means, a second outlet on said casing leading into the upper region of said turbulence chamber means for removing relatively light waste material, a third outlet on said casing communicating with the lower region of said turbulence chamber means, said third outlet functioning to remove relatively heavy waste matter, from said turbulence chamber means, a projection on said rotor at the second end thereof functioning to create turbulence within said turbulence chamber means and a second inlet in said casing for feeding diluting water into said turbulence chamber means to dilute material being introduced into the turbulence chamber means.

2. Apparatus as in claim 1 including a clearing strip carried by said rotor for acting on said screen, said strip being slightly inclined with respect to the rotor axis in such a direction as to carry material toward said second rotor end.

3. Apparatus as in claim 2 in which the distance between the outer surface of the rotor peripheral wall and said cylindrical screen is approximately 20mm.

4. Apparatus as in claim 2 in which the spacing between the outer edge of said clearing strip and said screen is between about 5mm and 10 mm.

5. Apparatus as in claim 1 in which said second rotor end is closed and in which said projection is a radially extending rib.

6. Apparatus as in claim 1 including a conically shaped cover for closing said first rotor end.

7. Apparatus as in claim 1 in which said first outlet is generally at the top of said casing.

8. Apparatus as in claim 1 in which said stock rotates in a generally circular path in said casing in response to rotation of said rotor and in which said second outlet and said second inlet comprises respective pipes, the longitudinal axes of which extend substantially tangential to and in the direction of movement of said stock.

9. Apparatus as in claim 1 in which said screen has a relatively thick wall and in which the openings therein widen in the direction of flow of stock therethrough.

10. Apparatus as in claim 9 in which said apertures are slots extending generally in the direction of said screen axis.

11. Apparatus as in claim 9 in which said apertures are bores which widen outwardly at an angle of at least 30°.

* * * * *